United States Patent [19]

Mauger

[11] Patent Number: 5,260,987
[45] Date of Patent: Nov. 9, 1993

[54] MOBILE COMMUNICATIONS

[75] Inventor: Roy Mauger, Enfield, Great Britain

[73] Assignee: Northern Telecom Limited, Montreal, Canada

[21] Appl. No.: 12,970

[22] Filed: Feb. 2, 1993

Related U.S. Application Data

[63] Continuation of Ser. No. 717,317, Jun. 18, 1991, abandoned.

[30] Foreign Application Priority Data

Jun. 18, 1990 [GB] United Kingdom ............. 9013598

[51] Int. Cl.$^5$ ............ H04M 11/00; H04B 1/00
[52] U.S. Cl. .................. 379/58; 379/59; 379/60; 455/541
[58] Field of Search ........... 379/56, 57, 58, 59, 379/60, 63, 90, 91, 112; 370/50; 455/31.1, 54.1

[56] References Cited

U.S. PATENT DOCUMENTS

| | | | |
|---|---|---|---|
| 4,675,863 | 6/1987 | Paneth et al. | 370/50 |
| 4,748,655 | 5/1988 | Thrower et al. | 379/60 |
| 4,775,999 | 10/1988 | Williams | 379/59 |
| 4,829,554 | 5/1989 | Barnes et al. | 379/58 |
| 4,833,701 | 5/1989 | Comroe et al. | 379/60 |
| 4,918,746 | 4/1990 | Serizawa | 455/54 |
| 4,939,785 | 7/1990 | Murata et al. | 455/54 |
| 4,955,050 | 9/1990 | Yamauchi | 379/59 |
| 4,972,460 | 11/1990 | Sasuta | 379/60 |
| 4,975,939 | 12/1990 | Sasaki | 379/60 |
| 5,027,388 | 6/1991 | Bradshaw et al. | 379/112 |
| 5,036,531 | 7/1991 | Spear | 379/58 |

FOREIGN PATENT DOCUMENTS

| | | |
|---|---|---|
| 0466078 | 1/1992 | European Pat. Off. |
| 2245454 | 1/1992 | United Kingdom |
| 2249693 | 5/1992 | United Kingdom |

OTHER PUBLICATIONS

Ameritech Mobile Communications, "Ameritech Mobile Phone Service Plans and Features", Jan. 1990.
Rolle, "Mobile Radio: Heading for a European Standard", Siemens Review, Mar. 1990.
Murray, "Why Wireless Voice in the Office", Oct. 1991.
International Conference on Communications ICC81 vol. 3, Jul. 14, 1981, Denver (US) pp. 5751-5756. F. J. Calvert et al "Auroca"—Automotic Mobile Telephone System.
Proceedings Of The International Switching Symposium May 7, 1984 Florence (Italy) pp. 1-4. J. Hoogeyeen "Control of Mobile Series".
8th European Conference on Electrotechnics Eurocon 88, Jun. 13, 1988 Stockholm (Sweden) pp. 470-473. S. Mansen et al "The GSM Base Station System and the Related Equipment".
Motorola, "Pocket Guide to GSM".
GSM: A Guide to Pan-European Digital Cellular Radio.
Motorola, "An Introduction To The Pan European Digital Cellular Network—G.S.M.—".

Primary Examiner—Jin F. Ng
Assistant Examiner—William Cumming
Attorney, Agent, or Firm—Lee, Mann, Smith, McWilliams, Sweeney & Ohlson

[57] ABSTRACT

A base station controller (BSC) personal communications network (PCN), which can for example be based on GSM, has associated with it a local PSTN network and is such that local calls between mobile subscribers and the local PSTN network can be made without involving a remote mobile-services switching centers (MSC), thereby permitting a cheap local call tariff to be employed whilst preserving the interfaces e.g. the GSM Abis and A interfaces. The BSC is intelligent and includes a BSC function, a local MSC function and a location register which slaves mobile subscriber location information from the MSC location registers.

8 Claims, 16 Drawing Sheets

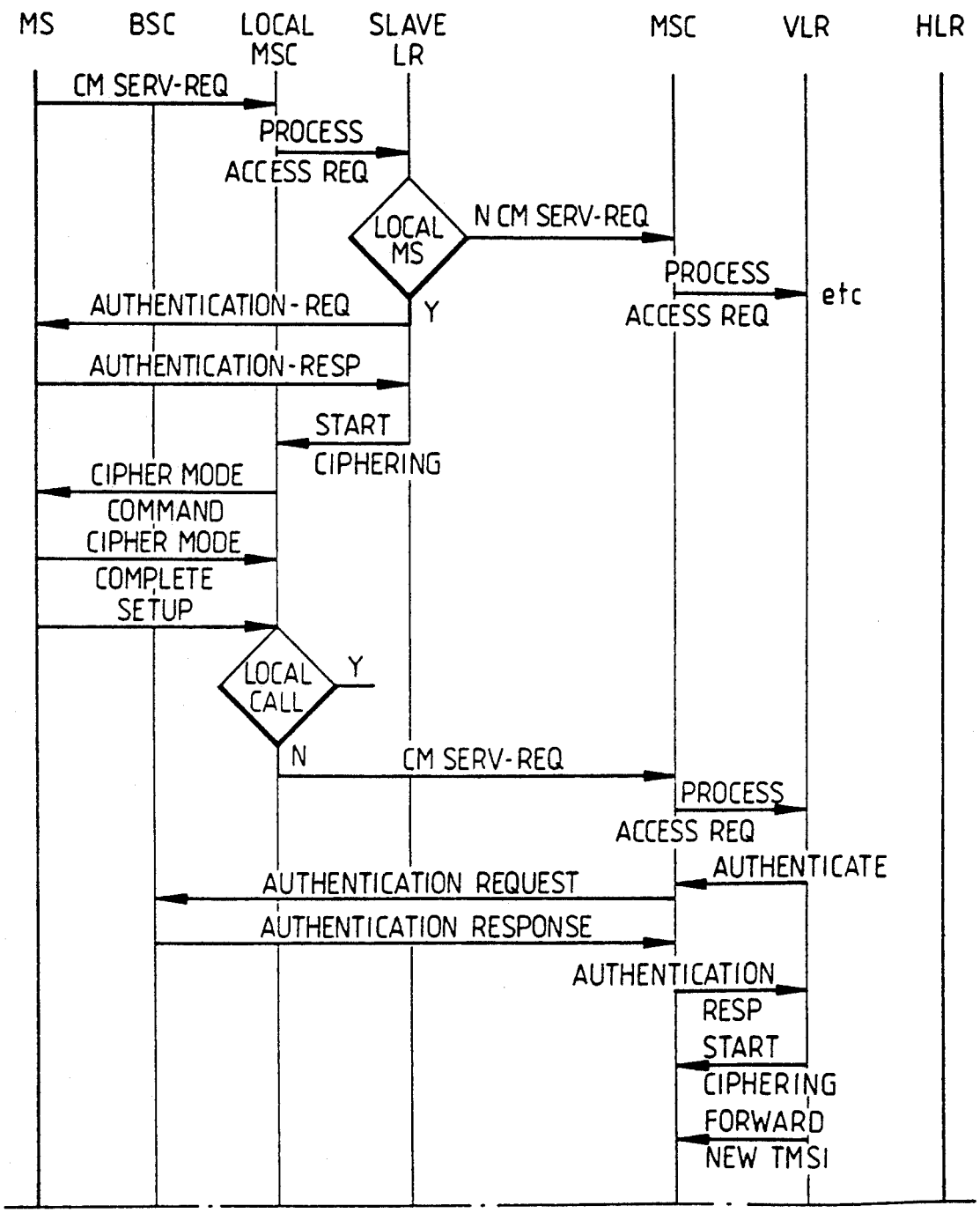

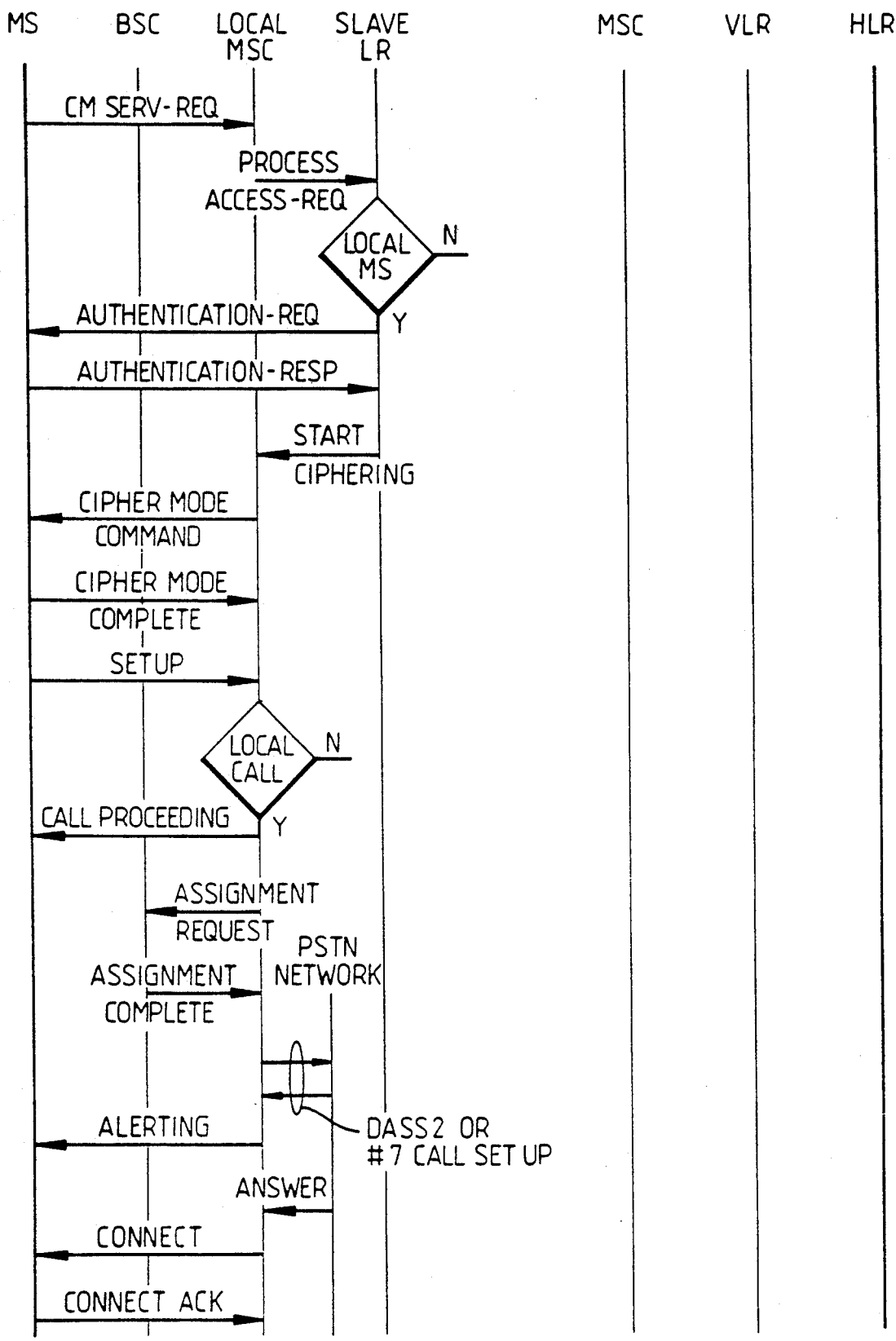

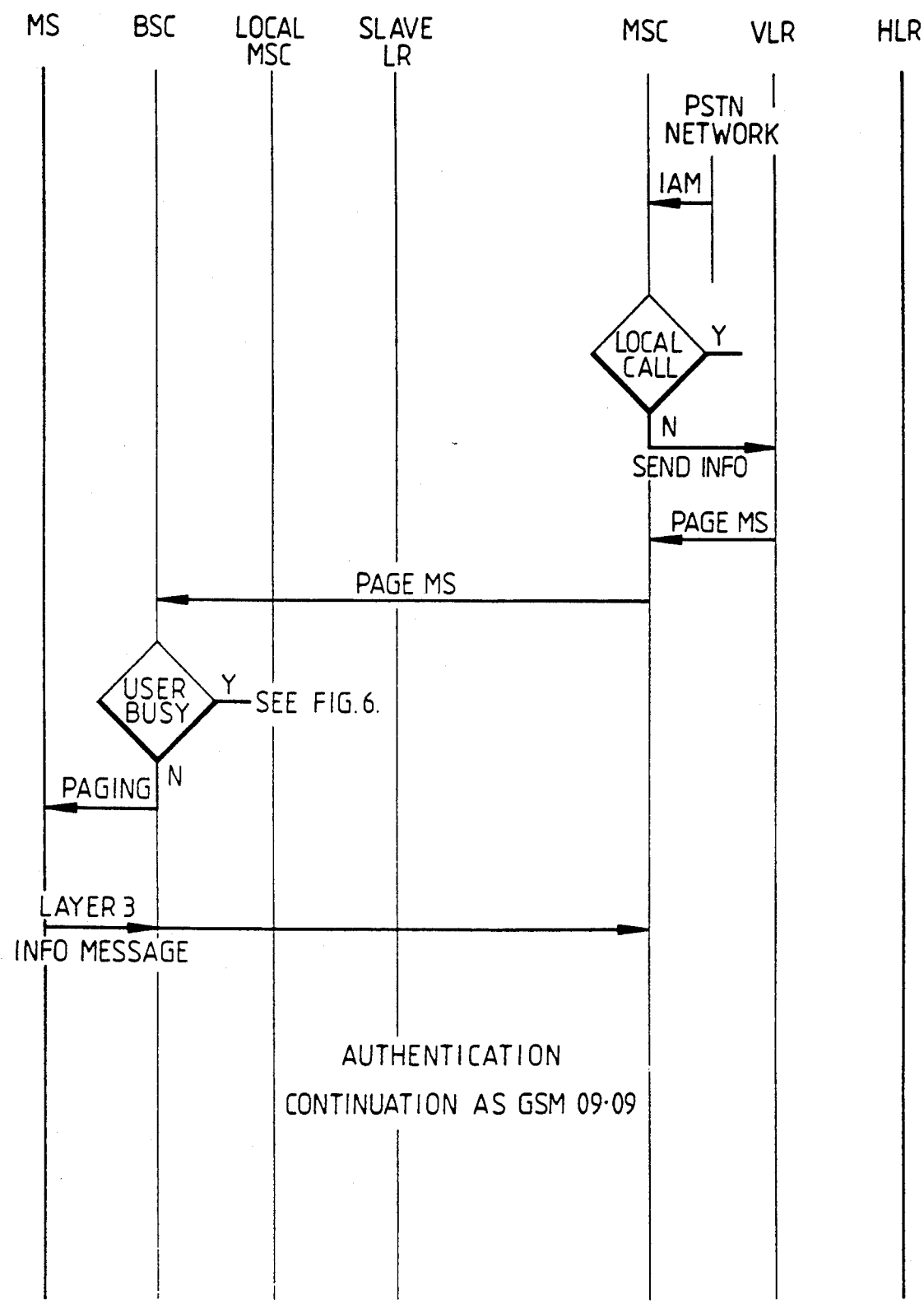

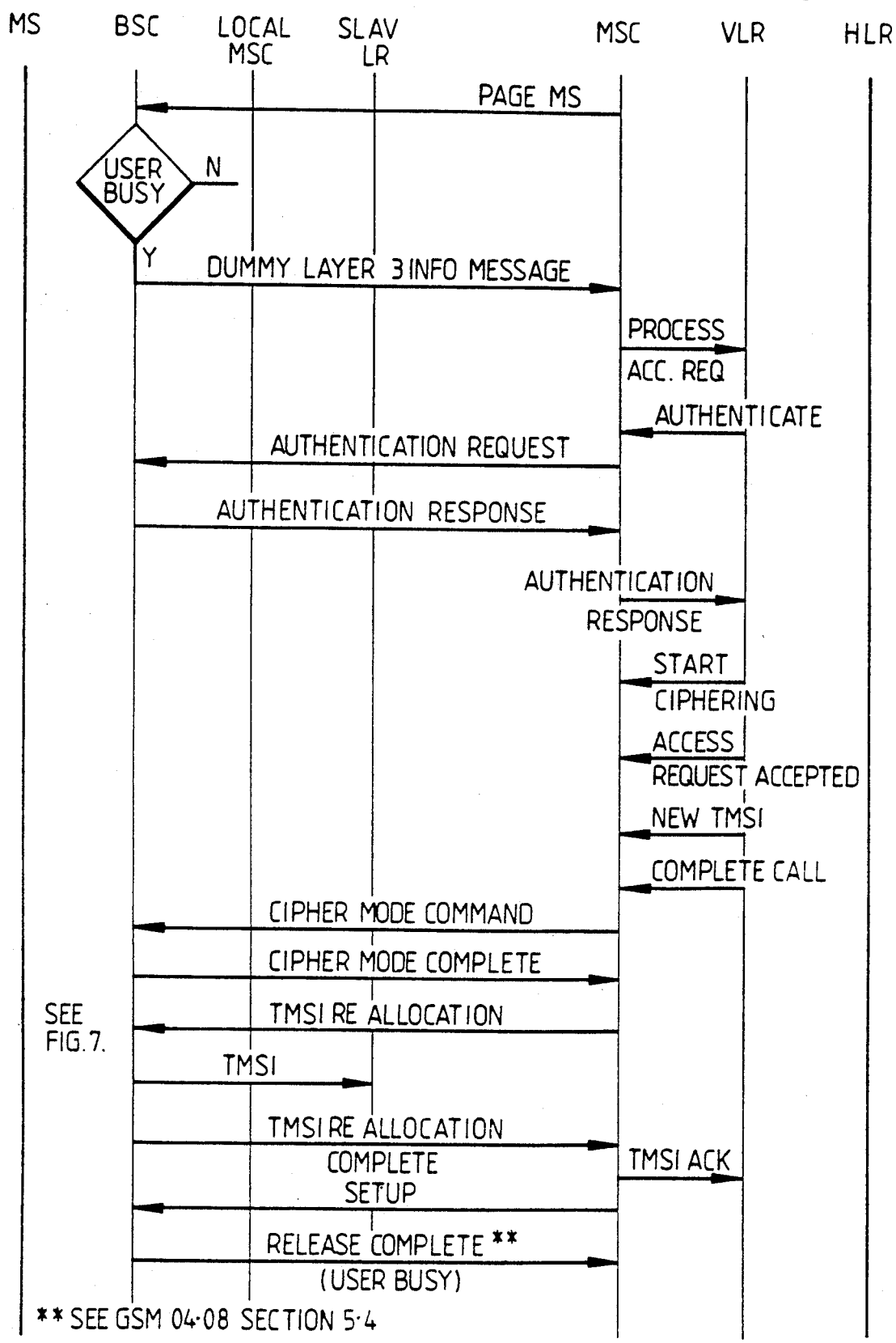
Fig. 6. NON-LOCAL CALL - MOBILE SUBSCRIBER BUSY

Fig. 13.

COST OF SECONDARY NODE

| | 240 CHAN BSC (8 BTS's) | | | 480 CHAN BSC (12 BTS's) | | | 960 CHAN BSC (16 BTS's) | | |
|---|---|---|---|---|---|---|---|---|---|
| | SCENARIO 1 | 2 | 3 | SCENARIO 1 | 2 | 3 | SCENARIO 1 | 2 | 3 |
| CAPITAL COST | | | | | | | | | |
| STANDARD BSC                SAY | 400 | 400 | | 800 | 800 | | 1600 | 1600 | |
| SMALL MSC                   SAY | | 1800 | | | 1800 | | | 1800 | |
| INTELLIGENT BSC £300 FIXED + £250 VARIABLE = £550 PER CHANNEL | | | 348 | | | 408 | | | 528 |
| TOTAL | 400 | 2200 | 348 | 800 | 2600 | 408 | 1600 | 3400 | 528 |
| MEGASTREAM ANNUAL CHARGE | | | | | | | | | |
| SEC NODE TO BTS's | 72 | 72 | 72 | 108 | 108 | 108 | 144 | 144 | 144 |
| PRIMARY NODE TO SEC NODE * | 240 | 72 | 48 | 432 | 120 | 48 | 840 | 192 | 72 |
| TOTAL | 312 | 144 | 120 | 540 | 228 | 156 | 984 | 336 | 216 |
| ANNUAL CHARGE 10 YEAR AMORTISATION | 352 | 364 | 155 | 620 | 488 | 197 | 1144 | 676 | 269 |

\* n+1 SECURITY         - 100KM PRIMARY SITE TO SECONDARY SITE

- 80% LOCAL CALLS       - 15KM SECONDARY SITE TO RADIO CELL CENTRE

- MEGASTREAM ANNUAL CHARGE
  £9K FOR 15KM + £175 PER ADDITIONAL KM

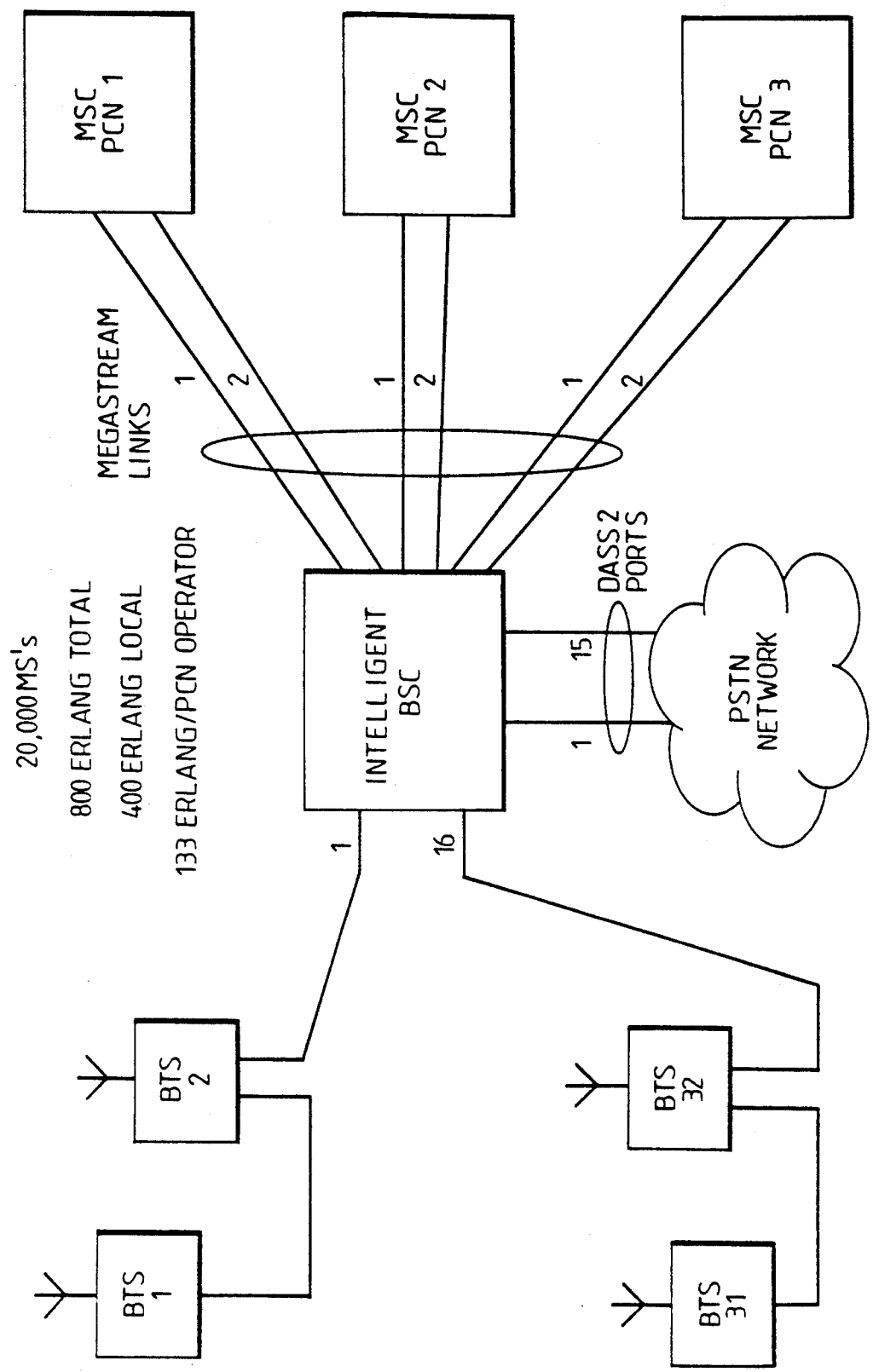

MOBILE COMMUNICATIONS

This application is a continuation of application Ser. No. 717,317, filed Jun. 18, 1991, now abandoned.

BACKGROUND OF THE INVENTION

This invention relates to mobile communications and in particular to system components thereof.

In Europe there are currently a number of different mobile communications standards which are incompatible with one another so that a mobile terminal designed for one system cannot be used with another. The Groupe Speciale Mobile (GSM) was set up in order to develop a single cellular standard for Europe. A GSM system network basically comprises a base-station system (BSS) which includes a base-station controller (BSC) and one or more base-station transceiver stations (BTS), a mobile-services switching centre (MSC), a home location register (HLR) and a visitors location register (VLR). Every subscriber (mobile station MS) is allocated to a home network, and possibly an MSC within that network, this being achieved by making an entry in the HLR. Whenever a mobile is switched on and at regular intervals thereafter, it will register with the system and give its location area (group of cells). If the mobile is not in its home area, the subscriber's data will be added to the visitor location register of the then local MSC. In the GSM system the MSC attends to the routing of a call to its destination, each MSC being connected to other MSCs, having interfaces for connection to PSTNs (Public Switched Telephone Networks such as BT or Mercury) and other services providers, and network management etc. functions.

Personal Communication Networks (PCN) now being developed in the UK are based on the GSM standards but will operate at 1.8 GHz rather than the 900 MHz of the basic GSM standards. The PCN systems arose as a result of the UK Government's Department of Trade and Industry "Phones on the Move" document which was basically aimed at improvement to current mobile communications (cellular radio telephones). The latter are analogue and restricted in capacity due to the limited band of wavelengths currently available. As a result of the UK Government freeing a higher wavelength band, nominally 2 GHz, and the use of digital techniques, improved communications can be obtained. PCNs will not however be restricted to such mobile communications, but rather are intended to support communications to and from any standard radio or fixed telecommunication network and hence to provide a single communications network with a universal personal communicator, i.e. a truly personal portable telephone which permits communication at all times. Since the PCNs proposed are based on GSM standards they can include similar components to the GSM networks referred to above, or may include variants which are compatible with both GSM and PCN networks.

SUMMARY OF THE INVENTION

According to one aspect of the present invention there is provided a mobile communications network comprising at least one base transceiver station (BTS) coupled to a base station controller (BSC) via a first interface, the BSC being coupled to a mobile switching centre (MSC) via a second interface, and wherein the BSC is associated with a local PSTN network and is such as to handle directly local calls between mobile subscribers associated with said BSC and said local PSTN whilst preserving said interfaces.

According to another aspect of the present invention there is provided a base station controller (BSC) for insertion between the A bis and A interfaces of a GSM/PCN mobile communications network, which BSC is in use associated with a local PSTN network and serves to handle directly local calls between mobile subscribers associated with said BSC and said local PSTN whilst preserving said interfaces.

BRIEF DESCRIPTION OF THE DRAWINGS

Embodiments of the invention will now be described with reference to the accompanying drawings in which

FIGS. 3A and 3B, and FIGS. 4 to 8 illustrate signalling messages involved for a PCN network incorporating the intelligent BSC;

FIG. 13 shows cost comparisons for the three scenarios of FIG. 12;

FIGS. 14 and 15 illustrate aspects of shared infrastructure BSS Systems, and

DESCRIPTION OF THE PREFERRED EMBODIMENTS

Figure 1:
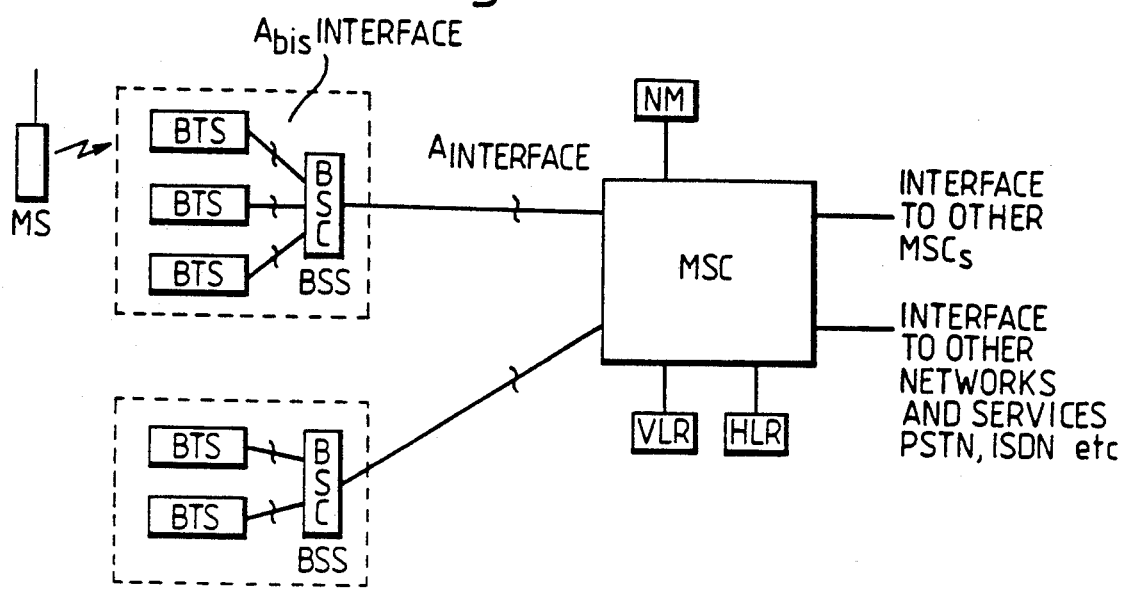
FIG. 1 illustrates a basic GSM network.

The basic GSM network illustrated—FIG. 1 includes the elements referred to above, i.e. mobile stations MS, Base-station systems BSS which include Base-station transceivers BTS and Base-station controllers BSC, a mobile-services switching centre MSC, a home location register HLR, a visitors location register VLR and interfaces to other MSCs, to other networks and services and to network management (NM) functions etc. The GSM recommendations specify a 16 kbit/s voice coding scheme (9.6 kbit/s data transmission) and adopt a 64 kbit/s PCM standard message format for traffic within the GSM network beyond the A interface, which is a point defined between the BSC and the MSC. This requires a transcoder within the network to support those signal format changes. In the basic GSM arrangement illustrated, a call made by a mobile station MS to a fixed telephone connected to a PSTN network has to be processed through the relevant BTS, BSC and MSC to the PSTN even if the fixed telephone is actually local to the mobile station MS or rather the associated BSC. The charges incurred in making such calls will thus be high since transmission to the MSC, which may be some considerable distance away from the BSC, will be over fixed lines (2Mbit/s links) which are expensive to provide or rent from existing public telephone operators (e.g. BT or Mercury).

Figure 2A:
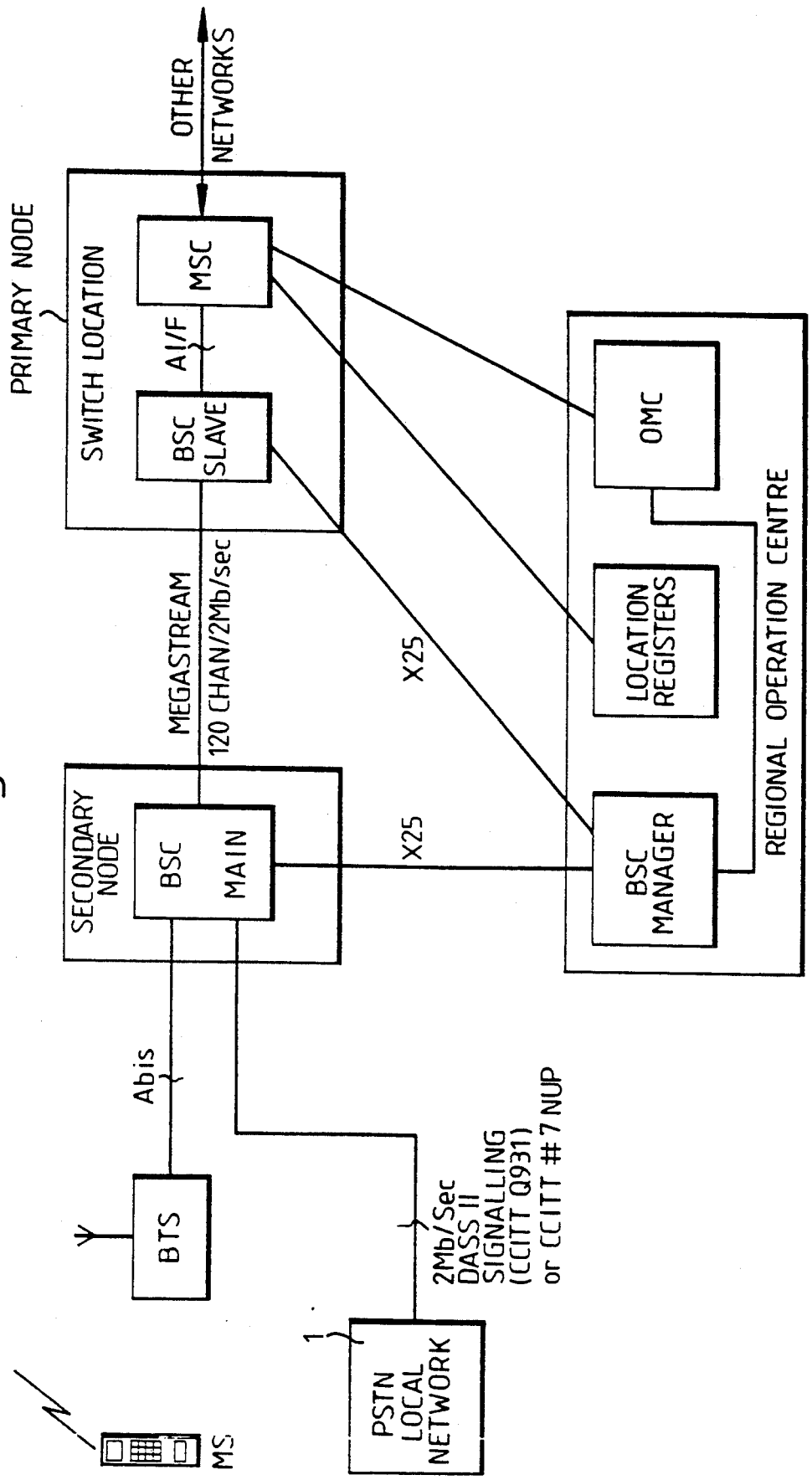
FIG. 2a illustrates a conceptual PCN network on which the present invention is based.
Figure 2B:
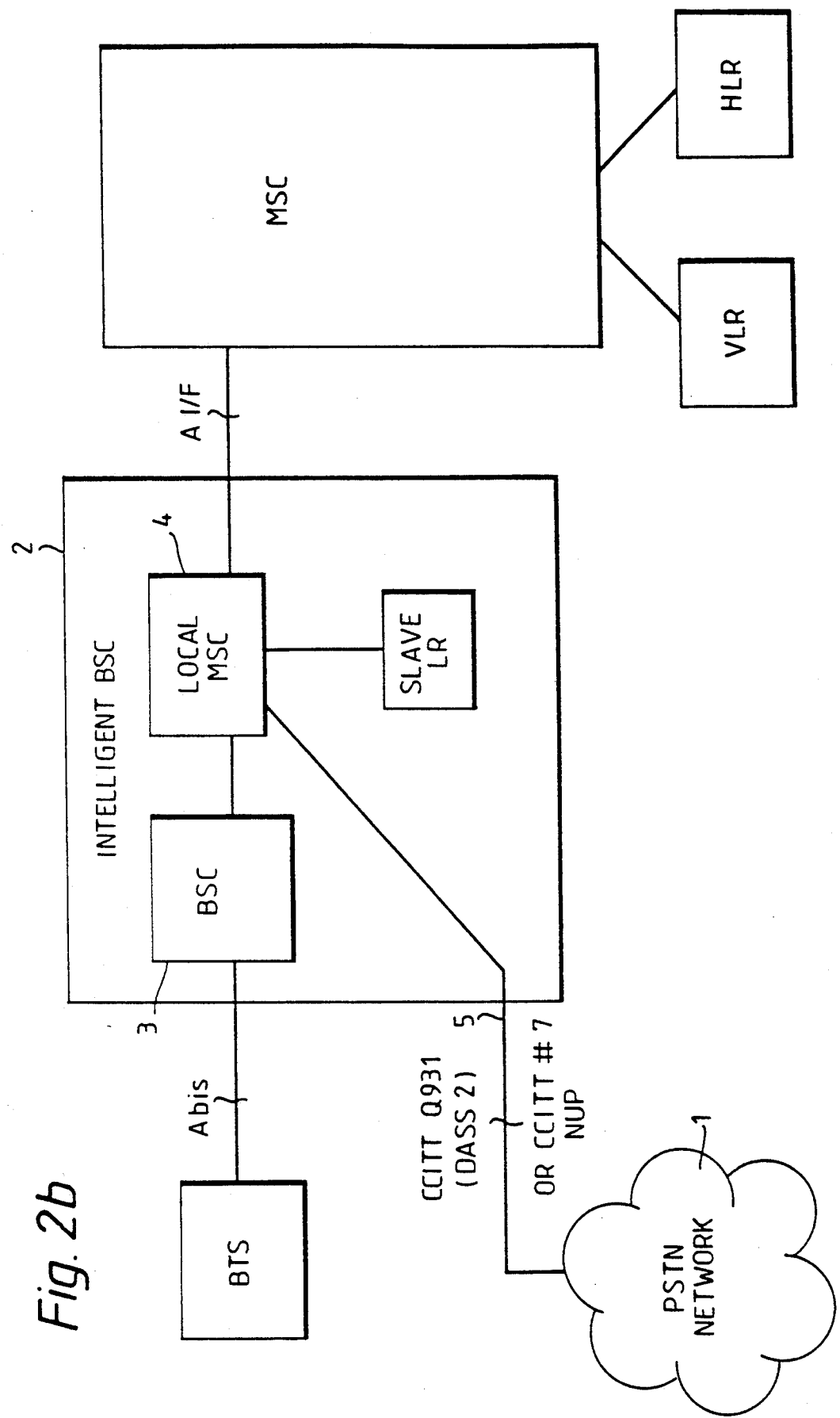
FIG. 2b illustrates part of the network of FIG. 2a in an alternative format and in particular an intelligent BSC according to the present invention.

The PCN network illustrated in FIG. 2a and 2b is such that for local calls the MSC is not involved in the actual call processing but rather the BSC recognises that a local call is involved and connects the call directly to the local PSTN network 1. The secondary node of FIG. 2a is the switching centre which provides the role of the BSC in the GSM recommendation. The secondary node controls a number of BTSs and routes traffic to the primary node which contains a transcoder function, an MSC and some associated node specific functions. It also contains the location registers which are used to locate and track subscribers MSs within the PCN. The overall network architecture is as shown in FIG. 2a. In this case the transcoder is implemented external to the BSC at the A interface to the MSC. The link between the BTS and BSC functions includes the A bis interface. The BTS/BSC and BSC/MSC links are, typically, rented 120 channel 2Mbit/s Megastream links. Flexible multiplexers, e.g. Northern Telecom Europe Limited's (formerly STC PLC) PDMX, can be employed to combine links from low traffic areas in order to maintain 120 channels per Megastream. To recognise that a local call is involved the BSC element of the GSM network is replaced by a so-called intelligent BSC 2 (FIG. 2b) which incorporates the basic GSM BSC function 3, a local MSC function 4 and a slave location register LR. The local PSTN network 1 is connected to a port of the intelligent BSC and thence to the local MSC function 4 via link 5. A transcoder (not shown) will also be needed at the BSC in link 5 to get out to PSTN network 1 (local exchange). The local access signalling over link 5 may be CCITT Q931 or national variant, e.g. DASS 2, or CCITT No 7 NUP (National User Part). The basic premise behind the operation of the intelligent BSC is that all normal MSC to MS, and vice versa, signalling passes through the intelligent BSC and that, by monitoring the messages that pass through it, the intelligent BSC is able to slave its location register off the main network location registers, without the latter being aware that this is taking place, and by means of the local MSC function it is able to identify calls from the MS that are local ones and terminate them into the local PSTN network 1. Thus local calls can be charged at a local rate i.e. tariffing of calls between a mobile and a fixed network telephone can be tailored to the mobile's physical location.

The signalling processes involved in achieving this differ from those required by the GSM signalling standard (GSM 09.09) in certain respects various examples of call set up etc. involving the intelligent BSC will now be described with reference to FIGS. 3 to 8.

Figure 3B:
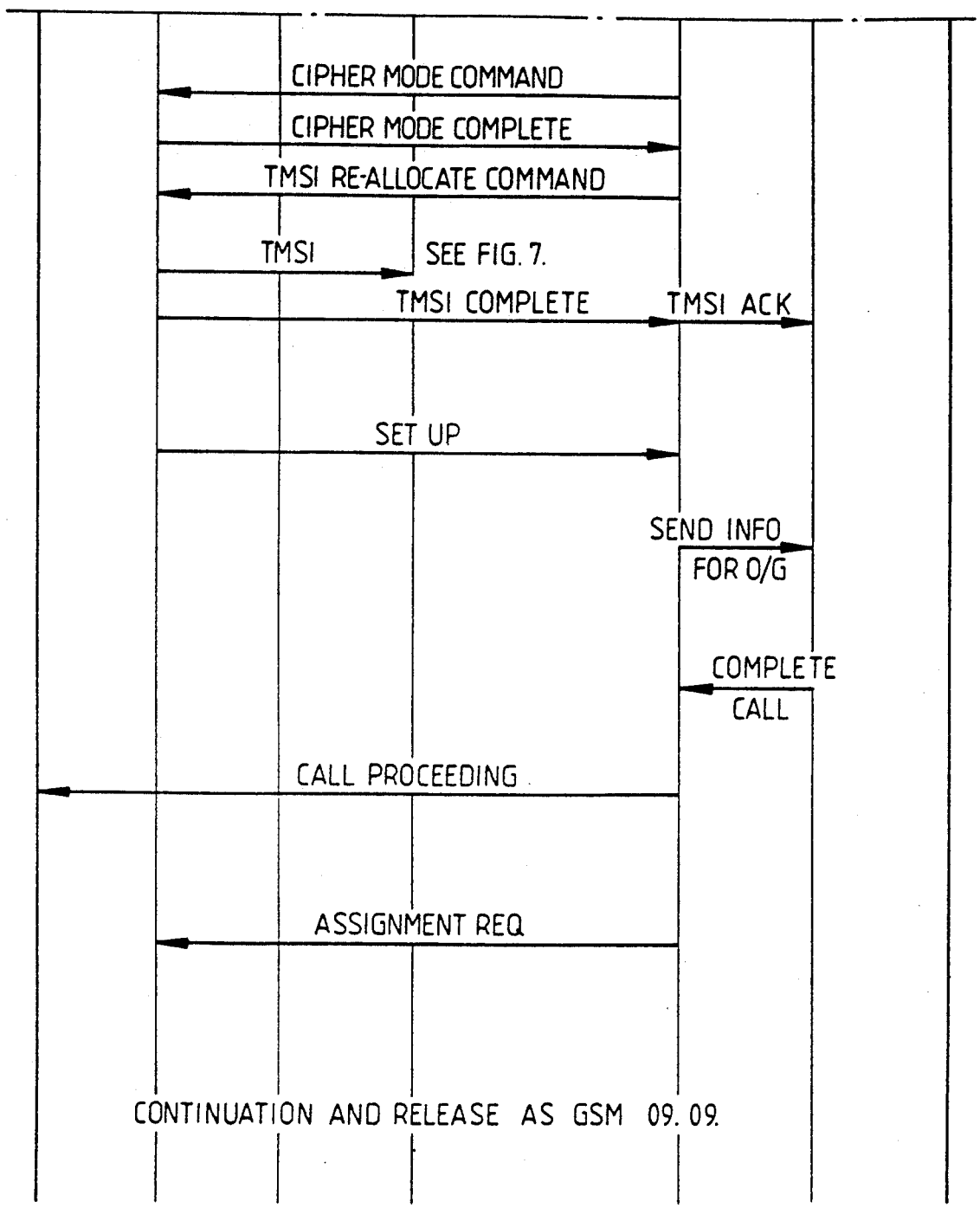

FIG. 3 illustrates a successful non-local call made between a PCN subscriber (MS) and a PSTN subscriber, i.e. an MS originating call. The first message is CM SERV REQ (CM Services Request) which the MS sends to the BSS and which in GSM is then sent to the MSC. This message does not contain any confidential information rather it contains service identity, classmark and mobile identity. In PCN, however, the CM SERV REQ message is sent to the local MSC which as a result sends PROCESS ACCESS REQ message (access request) to the slave LR which then checks to determine if the mobile station MS is a local one. If it is not (N) a local one the CM SERV REQ message is passed on to the MSC as in the normal GSM procedure and an access request to the MSCs VLR mode in the normal GSM manner and the call proceeds as normal. The MSC will not have been aware that the intelligent BSC had intercepted call message. If the call was (Y) from a local MS, the GSM authentication procedure is followed but activated by the slave LR rather than the MSC's VLR. This comprises an Authentication request (Req) message from the slave LR to the MS and an Authentication response (resp) message from the MS to the slave LR. If authentication was successful the slave LR requests the local MSC to start ciphering procedures. The message contains ciphering information and also indicates whether ciphering is used or not. A cipher mode command message is sent from the local MSC to the MS which returns a cipher mode complete message to the local MSC to indicate that the appropriate action on ciphering and deciphering has been started by the MS and the BSC. The MS then sends SETUP message, which contains confidential call information e.g. called party address (identity), to the local MSC which checks if it is a local call or not. If it is not a local call then the whole procedure is repeated but with the BSC emulating the role of the MS, as indicated in FIG. 3, so that the interface to the MS is not changed but emulated within the BSC in order to preserve the A interface. In this case there is also a request from the MSC's VLR to the MSC to forward new TMSI (temporary mobile subscriber identity), if reallocation of the TMSI is wished. The TMSI reallocate command for the MSC to the BSC transfers the value of the new TMSI in ciphered mode The TMSI is also transferred from the BSC to the slave LR as indicated and is used in the release procedure described hereinafter with reference to FIG. 7. The BSC then sends a TMSI reallocation complete message to the MSC and a TMSI reallocation acknowledge message is sent to the MSC's VLR. The setup message passes from the BSC to the MSC and the MSC sends a send information for O/G call set-up message to its VLR i.e. a request for subscriber parameters. The VLR sends a complete call message to the MSC, i.e. sends the subscriber information to the MSC, and the MSC sends a call proceeding message to the MS to indicate that the call is being proceeded. The MSC sends an assignment request to the BSC, the MSC seizing a terrestrial channel and asking the BSC to seize a radio channel as a result. Call continuation and release now proceeds as in GSM 09.09.

FIG. 4 illustrates the case where there is a successful PCN to PSTN local call. The first part of the signalling procedure, establishing that the MS is local, authentication, cipher procedure and setup is the same as FIG. 3. The answer to the question "is the call a local one?" is "yes" in this case, and the call proceeding message is sent from the local MSC to the MS together with the assignment request to the BSC which responds with an assignment complete message to the local MSC. The local MSC then employs CCITT Q931 or national variant, e.g. DASS 2, or CCITT No 7 NUP signalling to set the call up to the local PSTN network 1, resulting in an answer message when the called subscriber answers, a connect message from the local MSC to the MS to inform the latter that the call has been accepted by the called subscriber and a connect acknowledgement message from the MS to the local MSC. Call release proceeds as in GSM 09.09. The MSC is not aware in this case that a call has been made.

FIG. 5 illustrates a successful PSTN to PCN non-local call. The PSTN is indicated as between the MSC and its VLR since it is non-local to the BSC whereas PSTN network 1 in FIG. 4 was indicated between the local MSC and the slave LR since it was local to the BSC. The GSM 09.09 procedures are followed in this case but there is a possible condition which does not normally occur within GSM, i.e. that the called MS is busy without the MSC being aware of it, due to local call having been set up by the intelligent BSC. To cater for this the procedure is as follows. The PSTN networks sends a IAM (initial address message) to the MSC which then asks the question, "is this a local call?" If it is not a local call the MSC sends a "send information for I/C call up" message to its VLR to request the parameters of the called subscriber. The VLR then sends a page MS message to the MSC to start the paging procedure, and the MSC sends a paging message to the BSC to initiate paging of the MS, but which BSC must first answer the question "is the user (MS) busy?" since the MSC may not be aware of this condition. If "yes" the procedure illustrated in FIG. 6 is followed. If the user is not busy the BSC initiates paging and when the addressed MS has responded a complete layer 3 information message is sent to the MSC. Authentication and continuation is as GSM 09.09.

FIG. 6 illustrates the non-local call (mobile subscriber busy) procedure. The user busy "yes" answer causes the BSC to send a dummy layer 3 information message to the MSC, which as a result sends a PROCESS ACCESS REQUEST to the VLR. The procedure is then similar to that described with reference to FIG. 3, ending with a release complete message (user busy) from the BSC to the MSC in accordance with GSM 04.08 Section 5.4.

Figure 7:
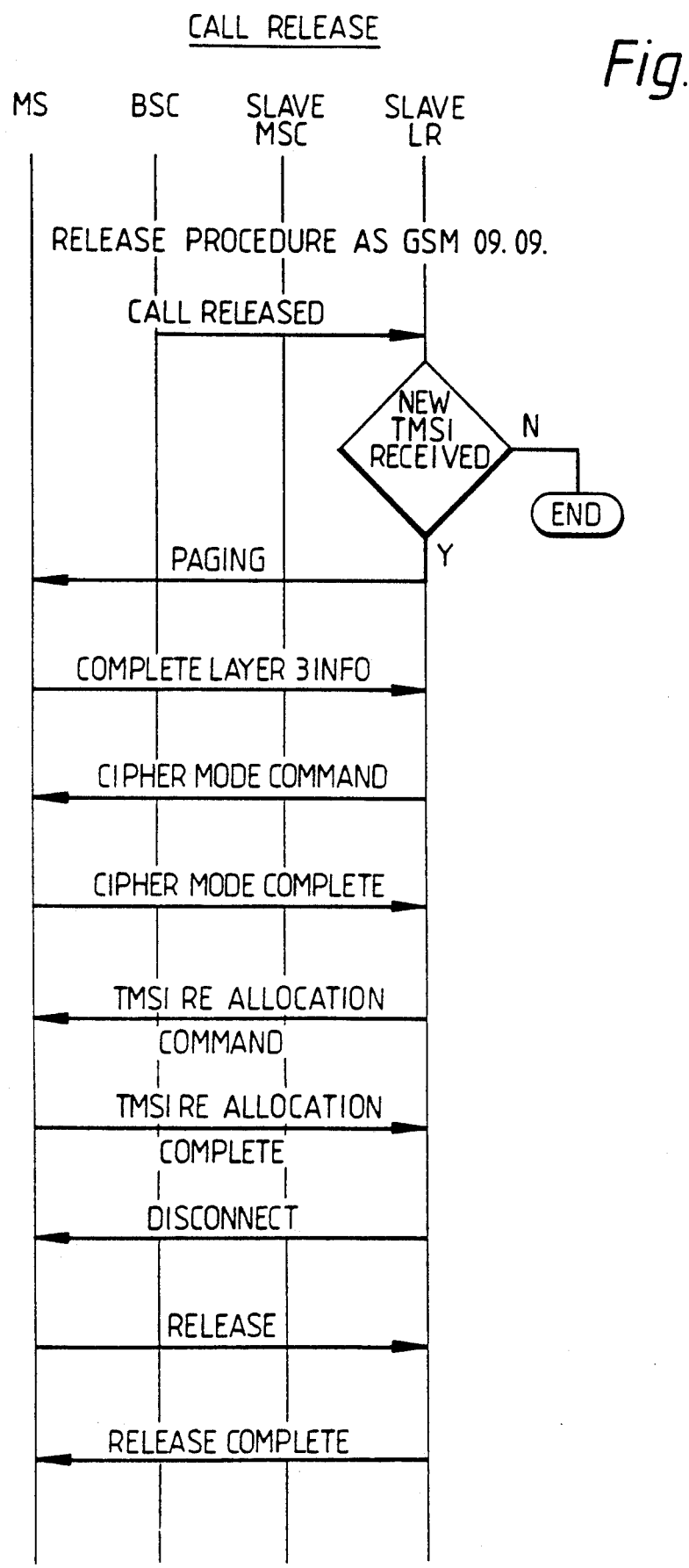

FIG. 7 illustrates the procedure at the end of a call in order to deal with the possible reception of a new TMSI during the call set up. When the BSC sends a call released message to the slave LR, the latter queries whether a new TMSI has been received. If "not" the procedure ends. If "yes", the mobile is paged and it responds with a "complete layer 3 info" message. A cipher mode command message is sent to the MS and a cipher mode complete message returned to indicated that the appropriate action on enciphering and deciphering has been started by the MS and the BSS. The TMSI reallocation command message transfers the value of the new TMSI in ciphered mode and the complete message confirms reallocation in the MS. The slave LR then sends a disconnect message to the MS which replies with a release message upon which the call is released and this is confirmed by a release complete message. This is effectively a new call which delivers the new TMSI but does not reach the speech phase.

Figure 8:
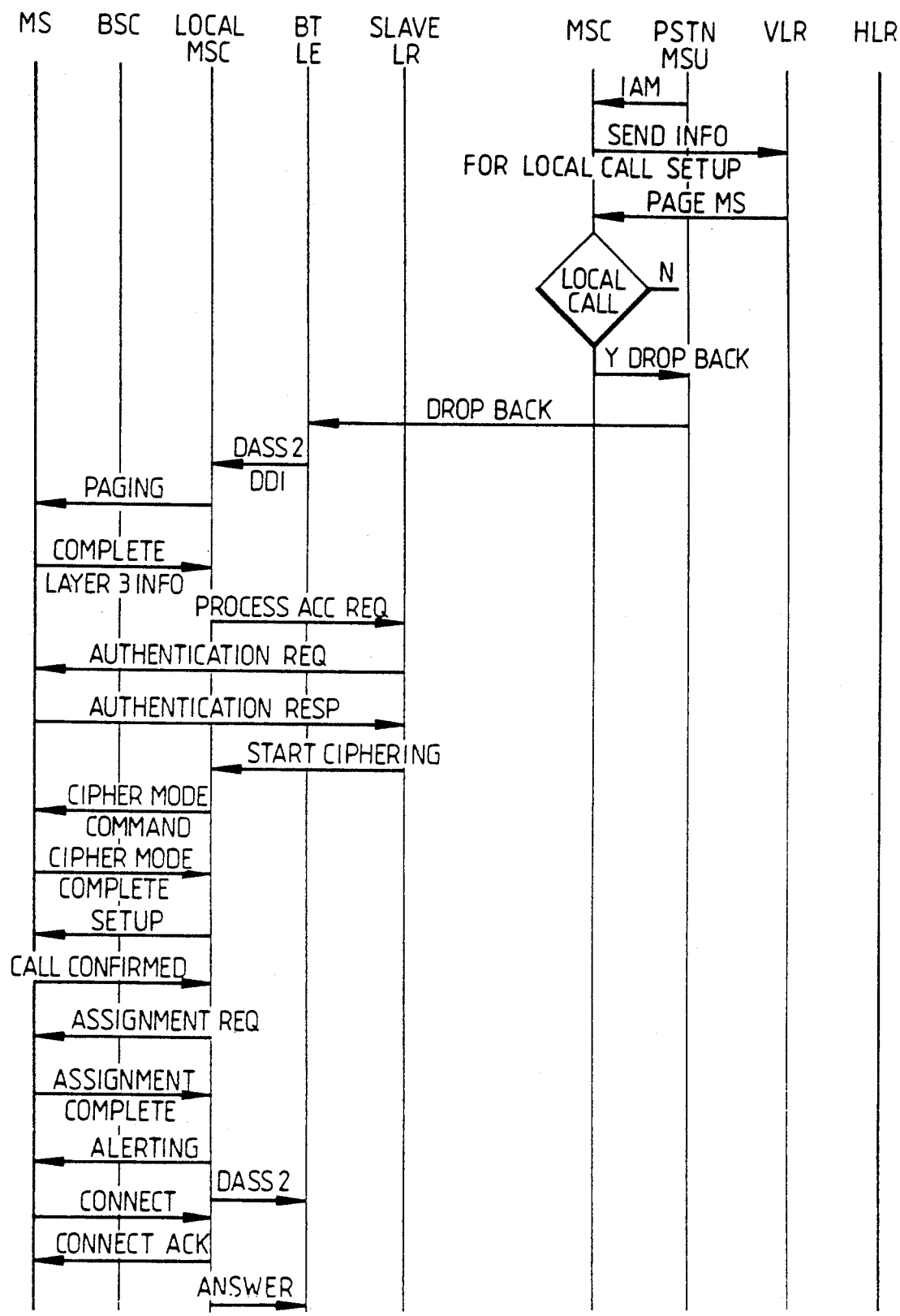

FIG. 8 illustrates a successful PSTN to PCN local call. As in the FIG. 5 procedure the IAM message is sent from the PSTN main switching unit (MSU) to the MSC, which then responds with a send information for local call set-up message to the VLR, and the VLR responds by sending a paging message "Page MS" to the MSC. The question "is the call local?" is asked and if the MSC answer is "yes" instructions are sent to the local PSTN (PSTN (BT) LE) via the MSU to take the necessary action. This is "drop back", which is a signalling mechanism defined within CCITT No 7 signalling, National User part. From the PSTN LE, DASS 2 signalling, for example, to the local MSC using a DDI code is employed. The local MSC initiates paging of the MS and the addressed MS responds to the paging by sending a complete layer 3 information message to the local MSC, which then sends a process access request to the slave LR. This is followed by authentication between the slave LR and the MS and a start ciphering message from the slave LR to the local MSC if authentication is successful. Then the local MSC and MS communicate for cipher mode command and complete, setup (for call establishment to the MS), call confirmation by the MS, assignment request and complete, alerting which is continued to the PSTN LE, connect and connect acknowledgement and answer which is sent to the PSTN LE. An example of how this local calling works within the context of an intelligent BSC will now be described with reference to FIG. 9.

Figure 9:
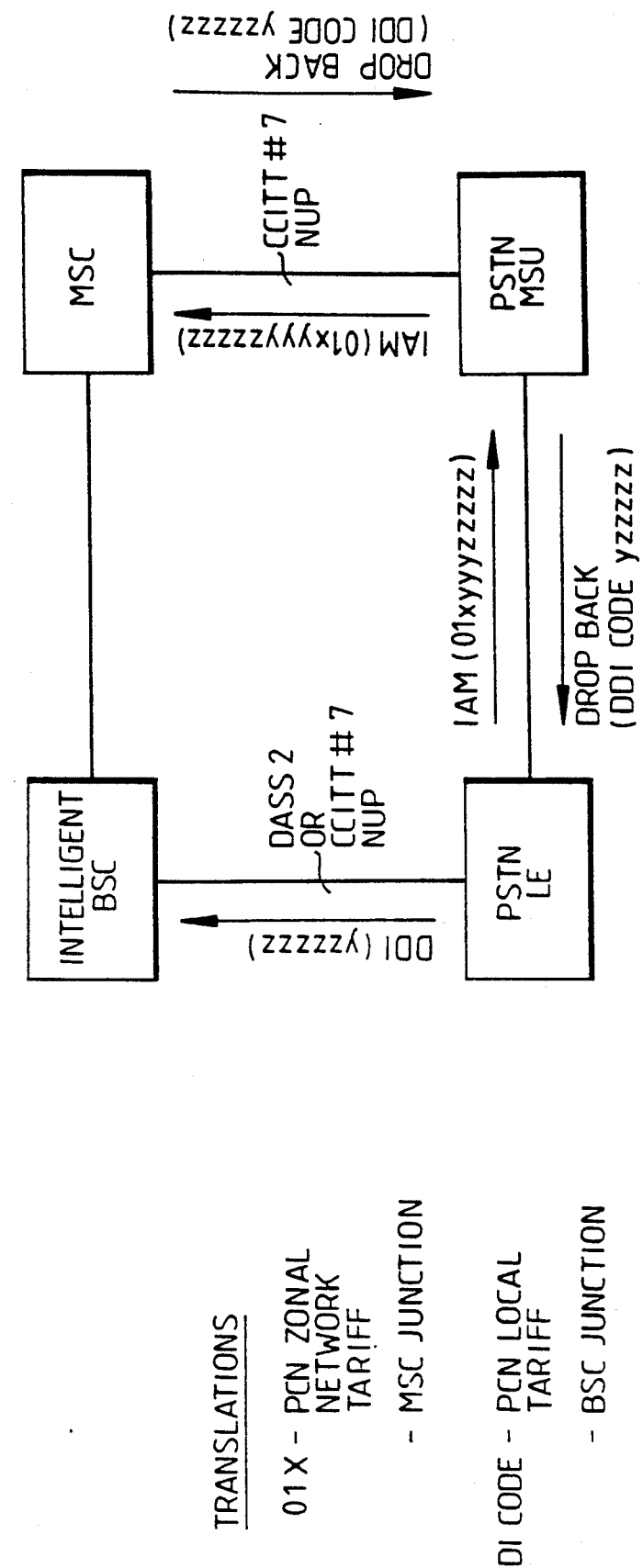
FIG. 9 illustrates an example of PSTN to PCN local call signalling.

For this example it is assumed that the PCN number is of the form shown in FIG. 9, but this is not the only possibility. The number has four basic components, a PCN designation, a PCN operator discriminator digit, a BSC discrimination code and a subscriber number within the BSC. Hence as illustrated a PCN number is in the form

01 X YYY ZZZZZ

The choice of 01 for the PCN designation is only one possibility although that is particularly attractive now that it is no longer employed for the London numbers.

When the PSTN LE receives a call for 01 XY-YYZZZZZ it translates 01X as being a PCN zonal tariff and gives the appropriate MSC junction. A number 7 signalling messages IAM(01X YYY ZZZZZ) is then sent to the MSC, via the MSU as illustrated. If the call is a zonal call there is no problem, but if it is not a zonal call (i.e it is a local call) then the MSC translates the message to give a DDI code comprising part of the PCN number (DDI Code YZZZZZ) and that is sent back (drop back) to the local exchange identifying a PCN local tariff and a BSC junction (the intelligent BSC in this example), which can be sent to the intelligent BSC as a DASS 2 message or a No 7 message, so that the call proceeds using the PCN local tariff.

Figure 10:
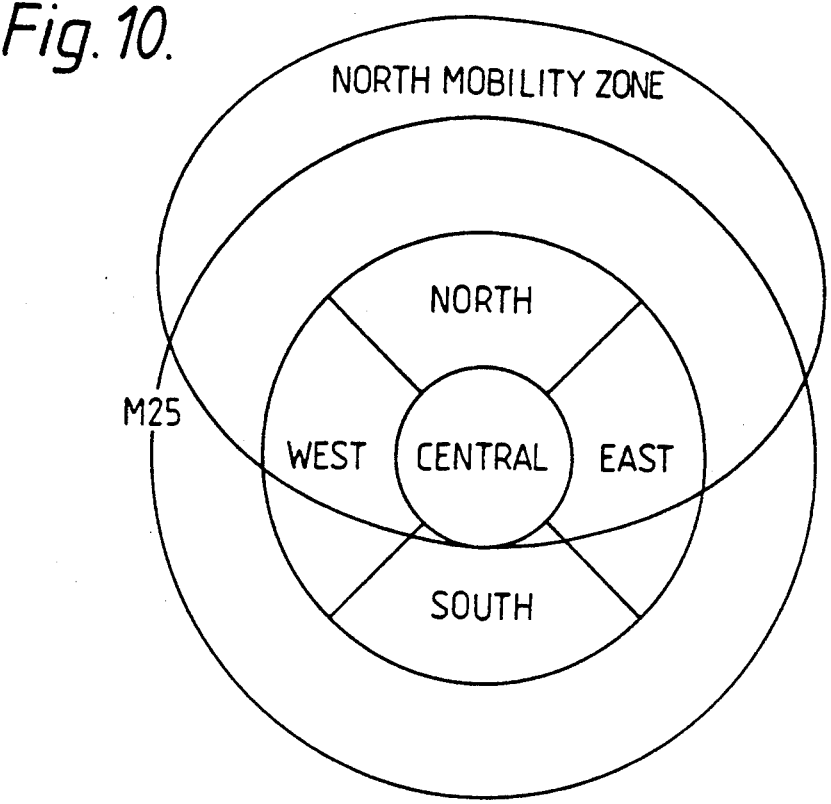
FIG. 10 illustrates a local access scheme for a large city.
Figure 11:
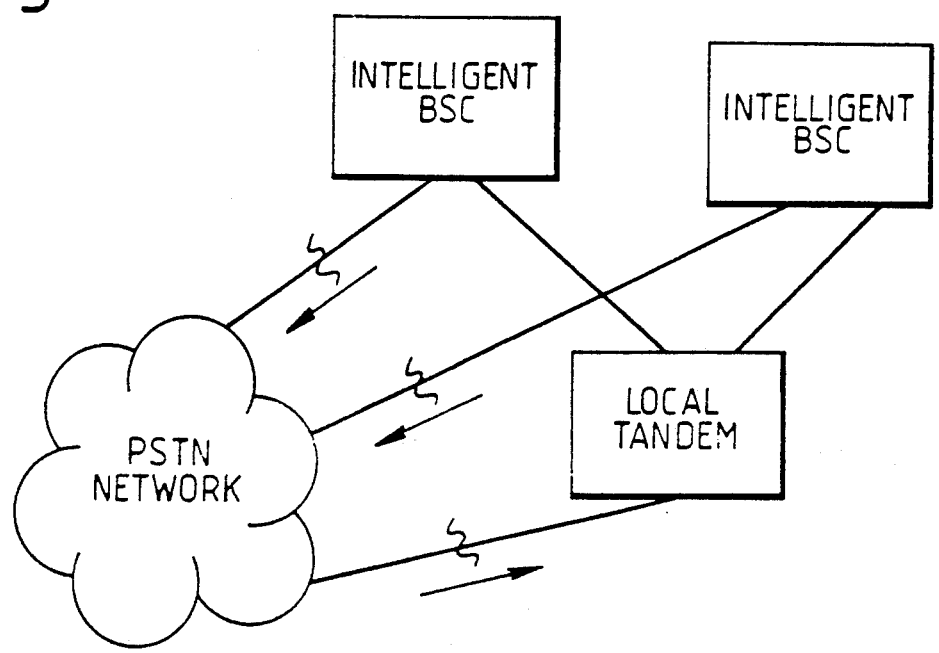
FIG. 11 illustrates local access for high capacity nodes.

An example of how this could be applied to a large city, such as London, will now be described with reference to FIG. 10. It is assumed that within a city boundary, such as defined by the M25 motorway around London, the city is divided into five zones (central, north, south, east and west). A local tariff is applied when a MS is within an associated mobility zone. For example, FIG. 10 indicates a north mobility zone associated with a MS whose home zone is the north zone or whose base is on a north zone boundary e.g. north/east zone boundary. Each BSC has associated with it a number of BTSs in order to cover respective areas of each zone. Handoff (handover) is determined within a BSC. Cheap local calls are terminated on leaving a mobility zone. This cheap local calling is a special service and there may be two classes of subscribers, "personal" class where cheap local calls are assumed but if full mobility is required, so that calls are not lost when a mobility zone is left, the called number can be prefixed by a hash (#). Alternatively, "feature" class where full mobility is assumed but a hash prefix is added when cheap local calls are required. A number of DDI codes are allocated per zone, for example 10. In London that would involve 150. Initially one DDI code per BSC will suffice, the capacity of a BSC being 20000 lines. With system growth available capacity could be quickly exceeded, in which case it would be necessary, for example, to identify a local tandem for return traffic as indicated in FIG. 11, in which case there would be one DDI code per tandem.

Figure 12:
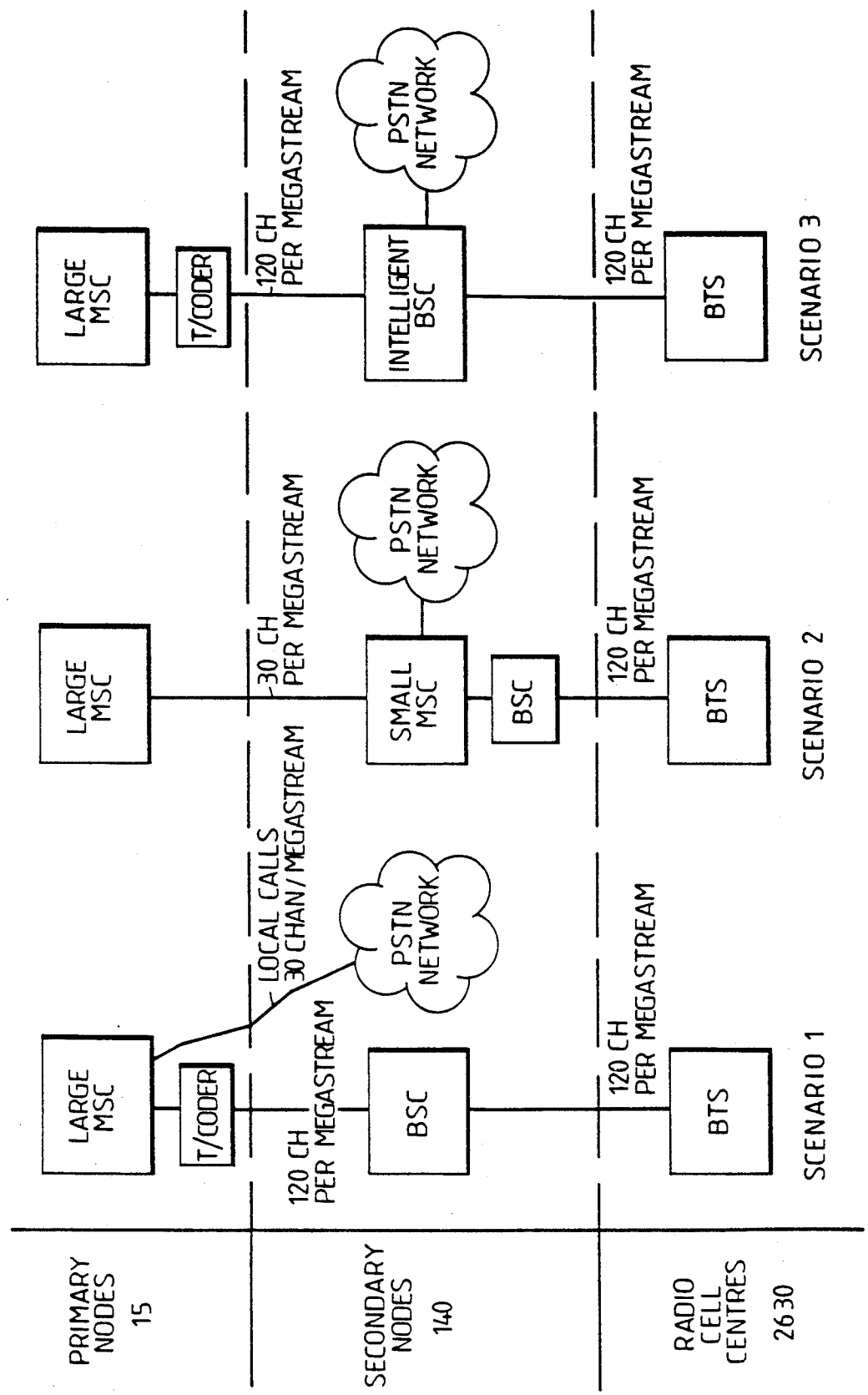
FIG. 12 illustrates three different local call scenarios.

The local call tariffs apply for calls between MSs within a zone, MS to city fixed network and city fixed network to MS. If required MS to MS within the whole city could be implemented at the local call tariff from the MSC. If required a mobility zone could cover the whole of the city with grooming between a BTS and a BSC to share BTS channels over more than one BSC In FIGS. 12 and 13 there are illustrated three scenarios for achieving local calls. The numbers of primary nodes, secondary nodes and radio call centres quoted are examples only. Scenario 1 has standard BSC secondary nodes and calls to a PSTN network are via 30 channel per Megastream links connected directly to a large MSC, this is an example of the conventional arrangement of FIG. 1 which has the A bis and A interfaces over 120 channels per Megastream links. Alternatively (Scenario 2), at the secondary nodes is disposed an additional small MSC which is connected to the PSTN network. In this case the links between the secondary node and the large MSC are 30 channel per Megastream whereas the links to the BTS are 120 channel per megastream, thus the A and A bis interfaces are not maintained in this case and the transcoder must be moved to the secondary node. The arrangement proposed by the present invention (Scenario 3) and consisting of an intelligent BSC at the secondary node, which intelligent BSC is coupled to the PSTN network, allows the A and A bis interfaces to be preserved, the transcoder staying at the primary node, and thus enables certain conventional GSM equipment elements to be employed. The signalling has to be varied slightly as exemplified by the above to cater for the intelligent BSC. FIG. 13 illustrates estimates of the capital costs (in Pounds Sterling) of the secondary nodes according to Scenarios 1 to 3 for three different stages of BSCs, the associated Megastream annual charges and amortisation over 10 years, these being the costs of ownership of the secondary nodes, then it is clear that Scenario 3 is beneficial in cost terms.

Figure 16:
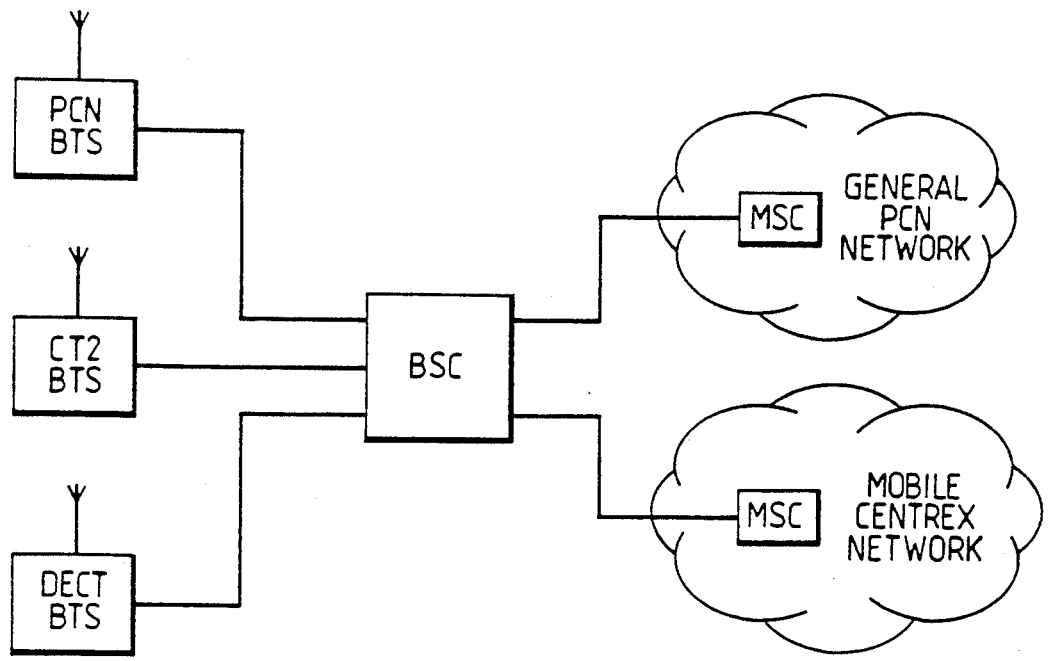
FIG. 16 illustrates a possible application of an intelligent BSC.
Figure 15:
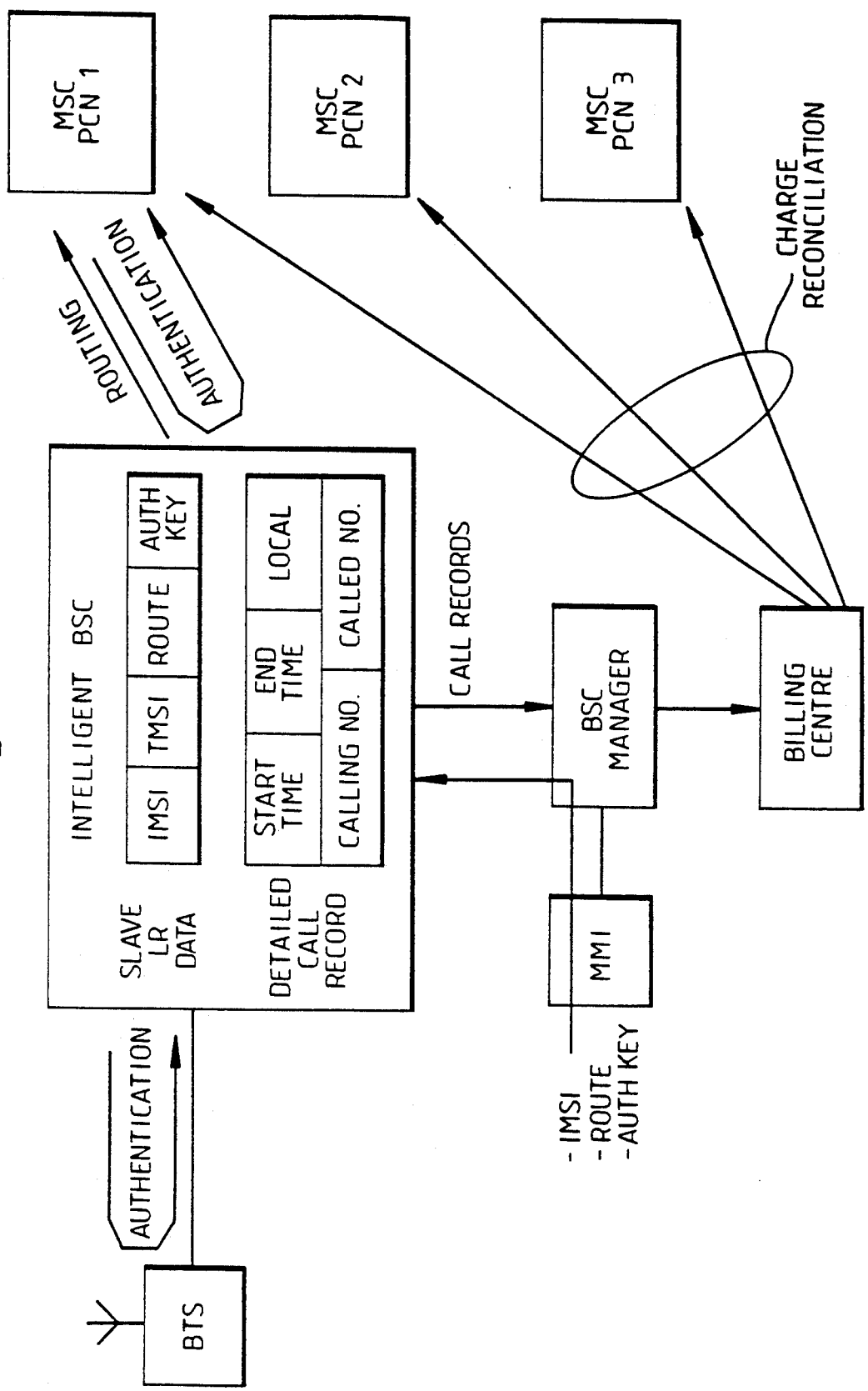

It is intended that there is more than one PCN network operator but that mobiles subscribing to one network operator can be connected via another network operator i.e. an intelligent BSC will need to distinguish between different handsets. FIG. 14 illustrates a BSS infrastructure employing an intelligent BSC which is shared between three PCN operators (PCN 1, PCN 2, PCN 3, for example Unitel, Microtel and Mercury) i.e. the intelligent BSC is connected to respective MSCs for the three PCN operators. Such infrastructure sharing is particularly beneficial in low traffic areas. The operation of such a shared BSS infrastructure is illustrated schematically in FIG. 15. The authentication procedure will in this case also involve deciding which operator is concerned and routing the messages appropriately, and the billing procedure will also involve appropriate charge reconciliation. The intelligent BSC can also be such as to act as a standards conversion function between different radio standards (illustrated in FIG. 16 as three different types of BTS (PCN, CT2 and DECT) and in addition support discrimination between two separate switching networks, the illustrated example has an MSC for a general PCN network and one for a mobile Centrex network.

Attention is drawn to our co-pending GB Application No 9013596.3, Ser. No. 224,5454A (U.S. Ser. No. 07/717,315, filed Jun. 18, 1991)(R H Mauger 3) which relates to a flexible interconnect for PCN, and to our co-pending GB Application No 9013605.2 (Ser. No. 2249693A)(U.S. Ser. No. 07/717,319, filed Jun. 18, 1991) (R H Mauger - A Wilton - C Field 4-1-1) which relates to a PCN cordless PABX.

The present invention thus proposes the use of an intelligent BSC disposed between A bis and A interfaces of the basic GSM network, of which the PCN network is a special case, which intelligent BSC enables local calls to be terminated into a local PSTN network without having to be passed via an MSC to a PSTN MSU and whence to a PSTN LE. This enables a cheap local call tariff to be employed whilst still preserving the GSM A bis and A interfaces. Whilst the invention has been described in terms of GSM, this is not the only application and it is also applicable to other communication standards/systems employing elements equivalent to the BTS, BSC and MSC of the GSM system, the BSC being associated with a local PSTN network and being such as to handle directly local calls between mobile subscribers associated with the BSC and the local PSTN whilst preserving the interfaces between the BTS and the BSC and the BSC and the MSC.

I claim:

1. A mobile communications network comprising at least one base transceiver station (BTS) coupled to a first base station controller (BSC) via a first standard interface, the first BSC being coupled to a first mobile switching centre (MSC) via a second standard interface, which first MSC has an interface for use in coupling the first MSC to other MSCs with respective BSCs and BTSs, and an interface for use in coupling the first MSC to other networks, wherein the first BSC is associated with a local PSTN (Public Switched Telephone Network) network, wherein for calls between mobile subscribers associated with the first BSC and mobile subscribers associated with a said other MSC, or subscribers associated with said other networks, call processing is handled by at least said first MSC, and wherein the first BSC is such as to handle directly local calls between mobile subscribers associated with said first BSC and the local PSTN without any change to said standard interfaces, and without any communication with the first MSC for call processing.

2. A network as claimed in claim 1 wherein the first BSC is capable of recognising said local calls and includes a BSC function, a local MSC function and a location register, the local MSC function directing said local calls between said mobile subscribers and said local PSTN.

3. A network as claimed in claim 2 wherein in use the location register slaves mobile subscriber location information from location registers associated with the first MSC.

4. A network as claimed in claim 1 wherein the first and second standard interfaces are GSM (Groupe Special Mobile) Abis and A interfaces respectively.

5. A network as claimed in claim 1 and such that mobile subscribers which subscribe to different network operators can be accommodated, the first BSC means to distinguish between the different network operators and to route calls as appropriate to a respective MSC associated with each network operator.

6. A base station controller (BSC) for insertion between the Abis and A interfaces of a GSM (Groupe Special Mobile)-based mobile communications network, said network comprising a base-station system including said BSC and one or more base-station transceiver stations, a mobile switching centre (MSC), a home location register and a visitors location register, which A interface is for connection of said BSC to the MSC in use of said BSC, and which BSC is in use associated with a local PSTN (public switched telephone network) network and serves to handle directly local calls between mobile subscribers associated with said BSC and said local PSTN without any change to said interfaces, and without any communication with said MSC for call processing.

7. A base station controller as claimed in claim 6 which is capable of recognising said local calls and includes a BSC function, a local mobile switching centre (MSC) function and a location register, and wherein in use the location register slaves mobile subscriber location information from location registers associated with the MSC.

8. A base station controller as claimed in claim 6 and including means to distinguish between mobile subscribers which subscribe to different network operators and to route calls as appropriate to a remote respective mobile switching centre (MSC) associated with each network operator.

* * * * *